US009977533B2

(12) United States Patent
Naito et al.

(10) Patent No.: US 9,977,533 B2
(45) Date of Patent: May 22, 2018

(54) TOUCH PANEL WITH INJECTION MOLDED HOUSING

(71) Applicant: Futaba Corporation, Mobara-shi, Chiba (JP)

(72) Inventors: Yasuyuki Naito, Mobara (JP); Kiyoyuki Deguchi, Mobara (JP); Takashi Inoue, Mobara (JP); Tomohiro Ishii, Mobara (JP); Tsubasa Mitsuhashi, Mobara (JP)

(73) Assignee: FUTABA CORPORATION, Mobara-Shi, Chiba (JP)

(*) Notice: Subject to any disclaimer, the term of this patent is extended or adjusted under 35 U.S.C. 154(b) by 0 days. days.

(21) Appl. No.: 15/270,739

(22) Filed: Sep. 20, 2016

(65) Prior Publication Data
US 2017/0090657 A1 Mar. 30, 2017

(30) Foreign Application Priority Data

Sep. 28, 2015 (JP) .................................. 2015-189970
Mar. 8, 2016 (JP) .................................. 2016-044586

(51) Int. Cl.
*G06F 3/045* (2006.01)
*G06F 3/041* (2006.01)
(Continued)

(52) U.S. Cl.
CPC ............ *G06F 3/0416* (2013.01); *G06F 3/044* (2013.01); *G06F 3/047* (2013.01); *G06F 3/0412* (2013.01);
(Continued)

(58) Field of Classification Search
CPC ...... G06F 3/0416; G06F 3/0412; G06F 3/044; G06F 3/047; G06F 2203/04103; G06F 2203/04104
See application file for complete search history.

(56) References Cited

U.S. PATENT DOCUMENTS

| 2010/0285260 A1* | 11/2010 | Bookbinder | .............. B32B 3/02 428/45 |
| 2015/0301669 A1* | 10/2015 | Miyazaki | ................ G06F 3/044 345/173 |
| 2017/0090656 A1* | 3/2017 | Naito | .................... G06F 3/0412 |

FOREIGN PATENT DOCUMENTS

| CN | 103974570 A | 8/2014 |
| CN | 104635974 A | 5/2015 |

(Continued)

OTHER PUBLICATIONS

Taiwan Intellectual Property Office, Examination Report, Application No. 105129569, dated Jul. 20, 2017.

*Primary Examiner* — Peter D McLoone
(74) *Attorney, Agent, or Firm* — Quarles & Brady LLP

(57) ABSTRACT

Provided is a touch panel having superior impact resistance and good design on an operation face side without a decorative layer. The touch panel is manufactured by providing a cover member on an operation face of the substrate and at an inner side of a lead-out line wiring region so as to avoid lead-out lines of the first electrodes and the second electrodes, and forming a housing portion by insert injection molding using resin material to the step portion created by disposing the cover member, so as to make a front face of the housing portion flush with a front face of the cover member, and so as to sandwich an outer edge of the substrate from upper and lower sides.

8 Claims, 5 Drawing Sheets

(51) Int. Cl.
*G06F 3/044* (2006.01)
*G06F 3/047* (2006.01)

(52) U.S. Cl.
CPC .............. *G06F 2203/04103* (2013.01); *G06F 2203/04104* (2013.01)

(56) References Cited

FOREIGN PATENT DOCUMENTS

| JP | 2011090443 | | 5/2011 |
|----|------------|---|--------|
| TW | 201123115 | A | 7/2011 |
| WO | 2014026579 | A1 | 2/2014 |

\* cited by examiner

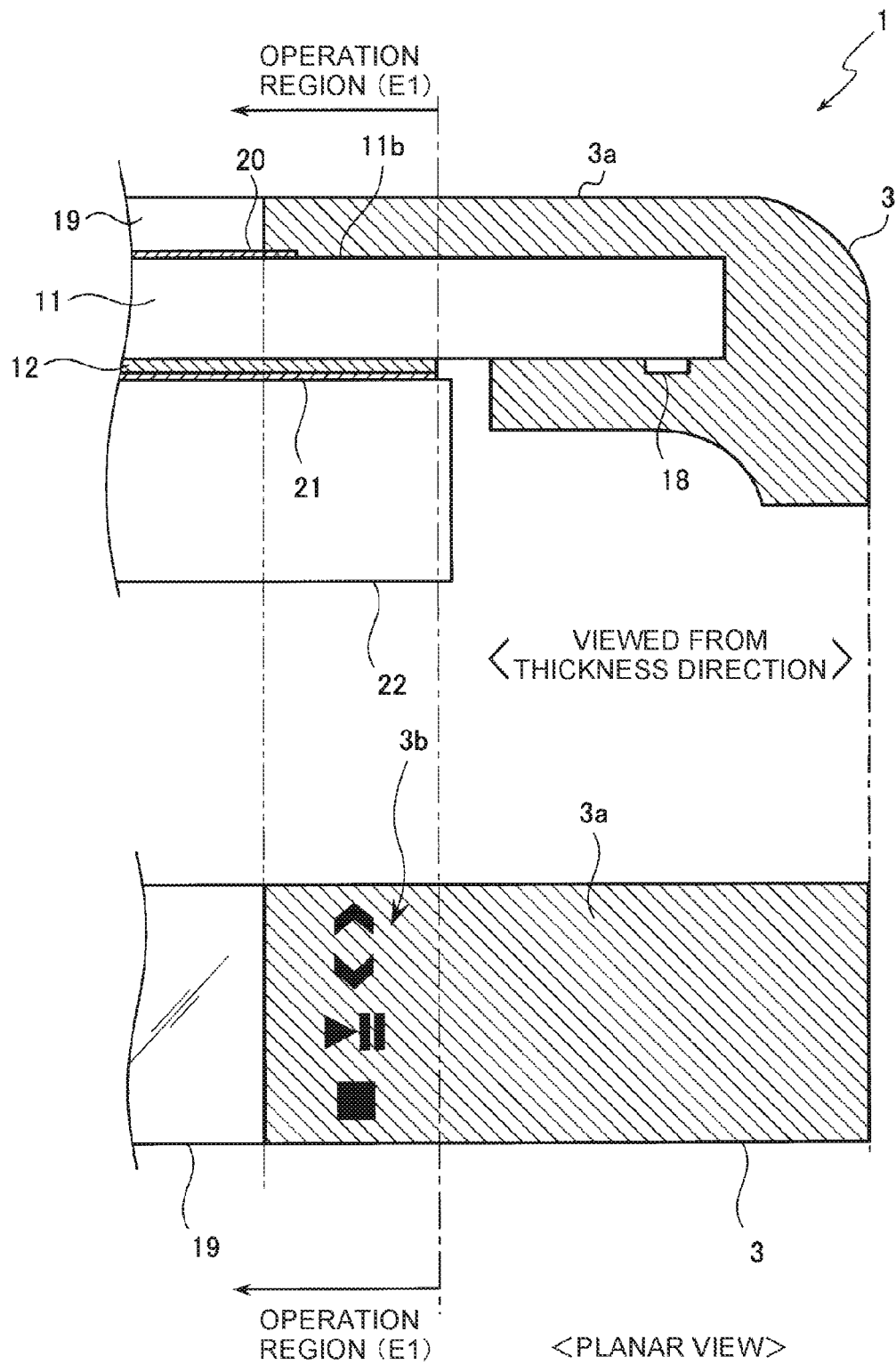

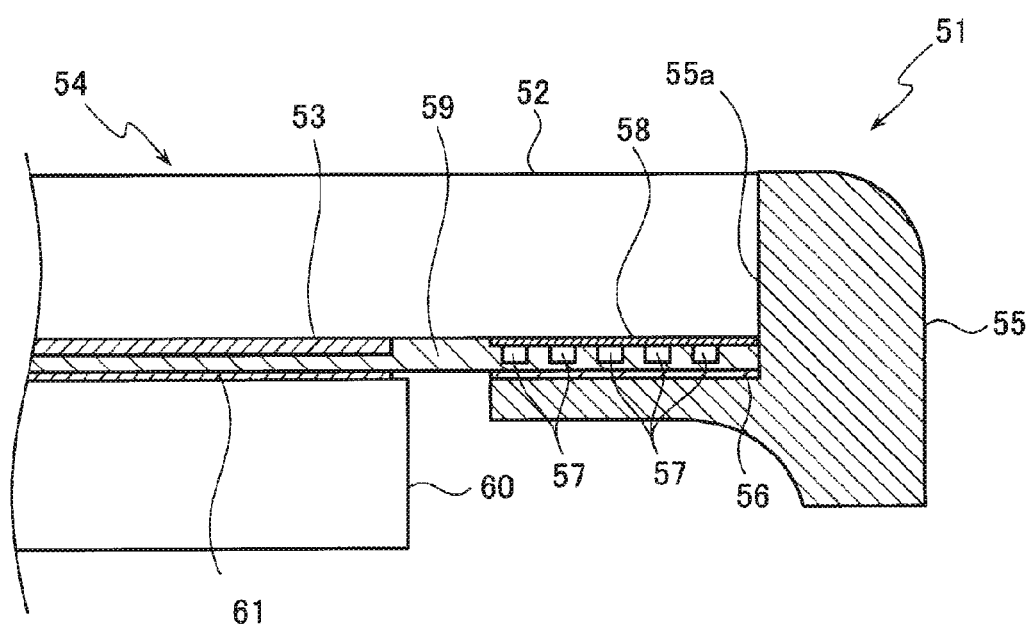

TOUCH PANEL WITH INJECTION MOLDED HOUSING

CROSS REFERENCE TO RELATED APPLICATIONS

This application is based on and claims the benefit of Japanese Patent Application No. 2015-189970, filed on Sep. 28, 2015, and Japanese Patent Application No. 2016-044586, filed on Mar. 8, 2016. The contents of these applications are incorporated herein by reference in their entirety.

TECHNICAL FIELD

The present invention relates to a projected capacitive touch panel capable of multipoint detection.

BACKGROUND ART

In recent years, an electronic device such as a mobile phone, a smart device (e.g., tablets, e-book reader, etc.) and an automotive navigation system is mounted with a display device with a touch panel function (i.e., a display device with touch panel, a touch panel device) having the advantage that it can provide intuitive operation and has superior durability, as one embodiment of interface.

A touch panel is a position input device which detects touch actions made by an indicator such as a finger and a stylus and identifies the coordinates of the touch position. The detection types are classified broadly into a resistive film type including an analog resistive film type and a matrix resistive film type, a capacitive type including a surface capacitive type and a projected capacitive type, an optical type including an infrared scan type and a retroreflective type, and an ultrasound waves type including a surface elastic waves type and a plate waves type. These various types have been put into practical use.

Meanwhile, in recent years, among the above-mentioned detection types, there is an increase in demand for especially a projected capacitive touch panel. The projected capacitive touch panel is configured such that, when a finger approaches, it detects changes in capacitance of electrodes near the finger as position coordinates on the touch panel, from two longitudinal and lateral rows of electrodes.

FIG. 5 is a partial cross-sectional view of one example of the projected capacitive touch panel mentioned above. A projected capacitive touch panel 51 shown in FIG. 5 has a basic structure that is manufactured by forming a sensor unit 54 and fitting the sensor unit 54 into an engagement recessed portion 55a of a housing portion 55 via an adhesive material 56 such as a double-sided adhesive tape. The sensor unit 54 includes one translucent substrate 52 and an electrode portion 53 provided on one face (i.e., a back face opposite to a front face corresponding to an operation face side) of the substrate 52. The electrode portion 53 is formed by laminating a plurality of rows of first electrodes (e.g., X electrodes) formed of transparent conductive films extending in a first direction (e.g., a lateral direction) and a plurality of rows of second electrodes (e.g., Y electrodes) formed of transparent conductive films extending in a second direction (e.g., a longitudinal direction) intersecting the first electrodes.

The substrate 52 includes lead-out lines 57 which are lead out from the respective ends of the electrode portion (i.e., the first electrodes and the second electrodes) 53 and which are formed via a decorative layer 58. Furthermore, there is provided a protective layer 59 made of transparent insulating film and formed so as to entirely cover the electrode portion 53 and the lead-out lines 57 of the sensor unit 54. A display device 60 such as a liquid crystal display is adhesively fixed via an adhesive material 61 such as a transparent adhesive tape at a position opposed to the sensor unit 54 of the substrate 52. Such projected capacitive touch panel is disclosed in Patent Literature 1 mentioned below.

Patent Literature 1: Japanese Patent Application Publication No. 2011-90443

SUMMARY OF THE INVENTION

Problem to be Solved

In the touch panel disclosed in Patent Literature 1, the lead-out lines 57 of the electrode portion 53 provided on the back face of the substrate 52 are arranged at a region other than an operation region (i.e., at an outer periphery), and the decorative layer 58 is provided to hide the lead-out lines 57 so the lead-out lines 57 are not visible to a user from the operation face side of the touch panel.

In this case, it is necessary to match the color of the decorative layer 58 with the color of the housing portion 55 to avoid spoiling the design of the electronic device mounted with the touch panel; however, it is very difficult to match the colors of the components which are made of different materials. In addition, there is a problem of an increase in manufacturing cost due to an increase in man-hour of the touch panel to provide the decorative layer 58.

Furthermore, the touch panel disclosed in Patent Literature 1 has a problem that, since the sensor unit 54 is fitted into the housing portion 55 and adhesively fixed via the adhesive material 61, the sensor unit 54 may possibly be separated from the housing portion when the touch panel is subjected to strong impact such as dropping.

Furthermore, since the electrode portion (i.e., the first electrodes and the second electrodes) 53 of the sensor unit 54 of the touch panel 51 is connected to a control IC (not shown) via the lead-out lines 57 extending from the ends of the electrode portion 53, corrosion of the lead-out lines 57 is likely to occur when they are exposed to outside air, possibly causing breaking of lines. Thus, to take measures against such problem, conventionally the protective layer 59 made of transparent insulating film is formed so as to cover the entire lead-out lines 57.

However, the performance evaluation test, under the condition of high temperature and high humidity (for example, 85 degrees C., 85%), carried on the touch panel 51 with the protective layer 59 made of the transparent insulating film have shown that, depending on the specifications of the protective layer, as time passes the moisture from outside passes through the protective layer 59 having the moisture permeability and reaches to the lead-out lines 57, causing the corrosion of the lead-out lines 57. Thus, for the constitution in which the lead-out lines 57 is simply covered by the protective layer 59, there is a need for further improvement in the corrosion resistance of the lead-out lines 57.

In view of the above-mentioned problems, an object of the present invention is to provide a touch panel which has superior impact resistance and which does not require a decorative layer but still has a good design when seen from operation face side.

How to Solve a Problem

To achieve the above-mentioned object, a first embodiment of the present invention provides a projected capacitive touch panel including a sensor unit having first electrodes and second electrodes intersecting with each other, each of the first electrodes and the second electrodes being constituted of a plurality of rows of electrodes, the first electrodes and the second electrodes being formed on a back face of a substrate having translucency such that an intersecting portion of the first electrode and the second electrode is insulated, and a housing portion formed by insert injection molding so as to sandwich the sensor unit, wherein a cover member is provided on a front face of the substrate so as to avoid lead-out lines of the first electrodes and the second electrodes and so as to cover at least a part of an operation region of the sensor unit, and wherein the housing portion is formed by insert injection molding using resin material so as to sandwich an outer edge of the substrate from upper and lower sides, so as to eliminate a difference in level between the cover member and the substrate such that a front face of the housing portion is arranged flush with a front face of the cover member.

A second embodiment of the present invention provides the touch panel according to the first embodiment, in which the housing portion is molded so as to cover at least front faces of the lead-out lines.

A third embodiment of the present invention provides the touch panel according to the first or second embodiment, in which the cover member is made of glass material.

A fourth embodiment of the present invention provides the touch panel according to the first or second embodiment, in which the cover member is made of transparent resin material.

A fifth embodiment of the present invention provides the touch panel according to the fourth embodiment, in which a projection is provide to the cover member at an abut portion at which the cover member abuts on the housing portion.

Advantageous Effects of the Invention

According to the present invention, it is possible to mask the lead-out lines without the need to provide the decorative layer for masking the lead-out lines to make them not visible from outside, resulting in reduction in the manufacturing cost. Also, since the housing portion is formed by insert injection molding with respect to the substrate, the substrate can be prevented from coming-off from the housing portion due to the strong impact such as dropping, thereby providing the touch panel with high reliability. Furthermore, by arbitrarily designing the shape of the cover member into an arbitrary shape such as a circular shape and a polygonal shape, the design of the touch panel can be arbitrarily changed by only changing the shape of the cover member while using the common sensor unit.

Furthermore, by forming the housing portion using insert injection molding so as to cover at least the region of the lead-out lines of the respective electrodes, the lead-out lines are entirely covered by the resin. Thus, the moisture is less likely to enter from outside, and the sufficient effect can be exerted against corrosion of the lead-out lines.

BRIEF DESCRIPTION OF DRAWINGS

FIG. 4 shows another example of the touch panel according to the present invention; and FIG. 5 is a partial enlarged cross-sectional view showing one example of an assembling structure of a convention touch panel.

DESCRIPTION OF EXEMPLARY EMBODIMENTS

Figure 1A:
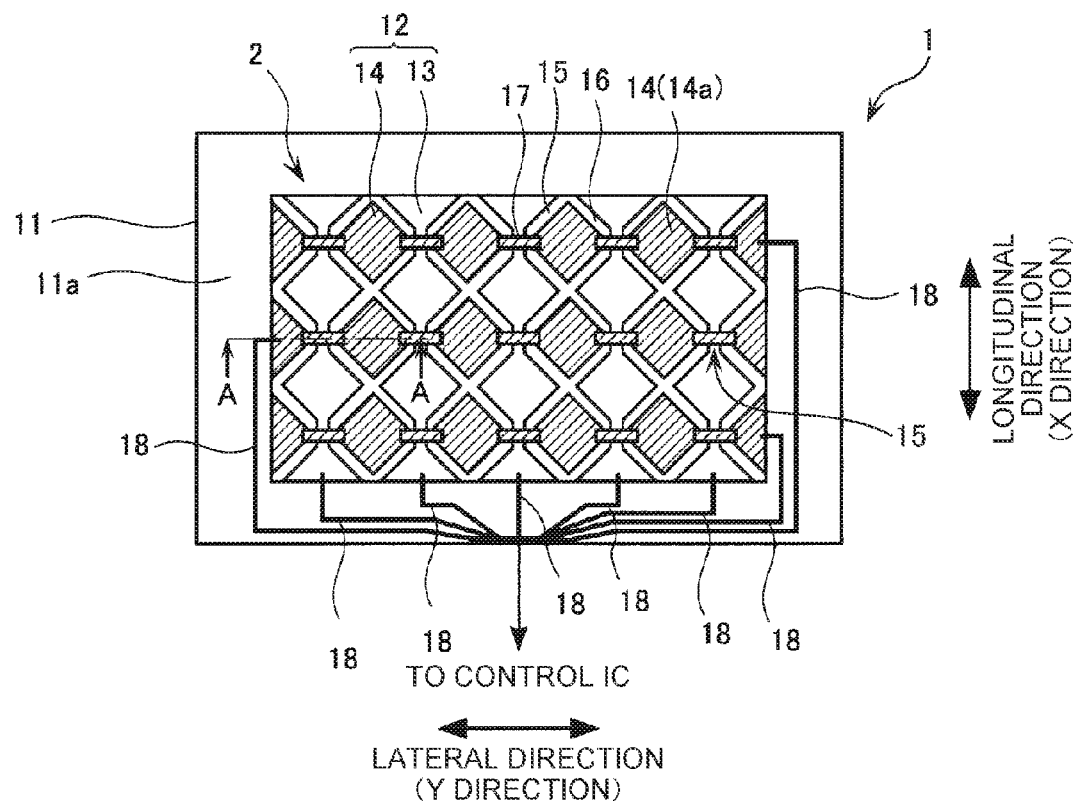
FIG. 1A is a plan view of a sensor unit of a touch panel according to the present invention seen from a back face side.

In the following, an embodiment of the present invention is explained in detail with reference to the attached drawings. It is to be understood that the present invention is not limited to this embodiment, and other embodiments, examples and operation practices that are conceivable to a person skilled in the art based on this embodiment are all included within the scope of the present invention.

In the following descriptions referring to the attached respective drawings, the terms such as upper, lower, right and left used to indicate direction or position correspond to upper, lower, right and left when a user sees the respective drawings as shown.

A touch panel 1 according to this embodiment is a projected capacitive touch panel which is capable of multipoint detection of a finger and which detects changes in capacitance of electrodes near the finger as position coordinates on the touch panel 1 from two kinds of rows, i.e., longitudinal and lateral rows, of the electrodes.

In the following, the constitution of the touch panel 1 according to the present invention is explained with reference to FIGS. 1 to 3. Although the touch panel 1 of this embodiment is shown to have a rectangular shape in a planar view, its shape is not limited to this and may be other shapes such as a square shape, a circular shape, oval and a polygonal shape.

As shown in any one of FIGS. 1A through 2B, the touch panel 1 of this embodiment includes a sensor unit 2 provided with an electrode portion 12 constituted of first electrodes 13 and second electrodes 14 formed on a back face (i.e., a face located opposite to a front face corresponding to an operation face) of a translucent substrate 11, and a housing portion 3 formed by insert injection molding so as to sandwich the sensor unit 2 from upper and lower sides (i.e., from the front and back sides of the substrate 11).

As shown in FIG. 1A, the sensor unit 2 has a rectangular plate-like substrate 11 as a base portion. The substrate 11 is formed of a translucent insulating material and is of a glass type or a film type. As the substrate 11 of a glass type, alkali-free glass, soda-lime glass, alumino-silicate glass and such are used. As the substrate 11 of a film type, a film made of resin such as polyethylene terephthalate (PET) is used.

The first electrodes 13 and the second electrodes 14 constituting the electrode portion 12 are formed on the back face (i.e., the face located opposite to the face to be operated by a finger, hereinafter called "operation opposing face") 11a of the substrate 11. The first electrodes 13 are formed by patterning a resist to a transparent conductive film such as ITO (Indium Tin Oxide) via photolithography and such and then applying etching. By doing so, the first electrodes 13 are formed as an array electrode in which a plurality of electrodes are aligned in a longitudinal direction (X direction) shown in FIG. 1A, for example.

Similar to the first electrodes 13, the second electrodes 14 are also formed by patterning a resist to the transparent conductive film such as ITO (Indium Tin Oxide) via photolithography and such and then applying etching. By doing so, the second electrodes 14 are formed as an array electrode in which a plurality of electrodes are aligned in a lateral direction (Y direction) shown in FIG. 1A, for example.

Figure 1B:
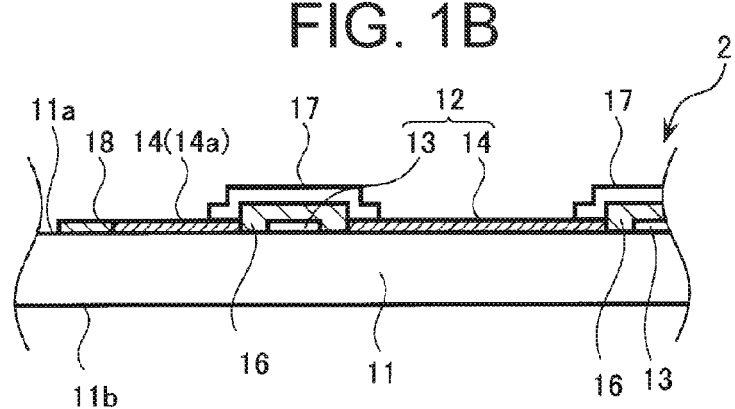
FIG. 1B is an enlarged cross-sectional view taken along a line A-A in FIG. 1A.

Next, the method of formation of the electrode portion 12 is explained. Firstly, on the operation opposing face 11a of the substrate 11, the plurality of first electrodes 13 extending in the longitudinal direction (X direction) in FIG. 1A and a plurality of electrode films 14a arranged in a separated condition in the lateral direction (Y direction) in FIG. 1A, are formed. Then, an insulating layer 16 is formed on the first electrode 13 at an intersecting portion 15 of the first electrode 13 and the second electrode 14. The insulating layer 16 provides electrical insulation between the first electrode 13 and the second electrode 14 and is formed of an insulating material such as acrylic resin. Then, as shown in FIG. 1B, the plurality of electrode films 14a are connected by a bridge line (jumper line) 17 in the lateral direction (Y direction) in FIG. 1A so as to cross over the first electrode 13, thereby forming the second electrode 14. In this regard, the bridge lines 17, which connect the electrode films 14a, 14a constituting the second electrode 14, are wired so as to pass over the insulating layers 16. In this embodiment, an inner rectangular portion shown in FIG. 2A, in which the electrode portion 12 is formed by the first electrodes 13 and the second electrodes 14, is referred to as an operation region E1 of the sensor unit 2.

In the method of formation of the electrode portion 12 described above, although the bridge lines 17 are used in the second electrodes 14, the constitution of the first electrodes 13 and the second electrodes 14 may be reversed, that is, the bridge lines 17 may be used in the first electrodes 13. In addition, the insulating layer 16 may be formed on the entire surface of one of the electrodes (i.e., the first electrodes 13 or the second electrodes 14), and the other of the electrodes (i.e., the second electrodes 14 or the first electrodes 13) may be formed on this insulating layer 16, as long as the intersecting portion 15 of the first electrode 13 and the second electrode 14 is insulated.

For the first electrodes 13 and the second electrodes 14 formed on the substrate 11 using the method of formation described above, respective ends thereof are lead out to an end of the substrate 11 by lead-out lines 18 and are connected by wiring to a control IC (control circuit) not shown, as shown in FIG. 1A.

Figure 2A:
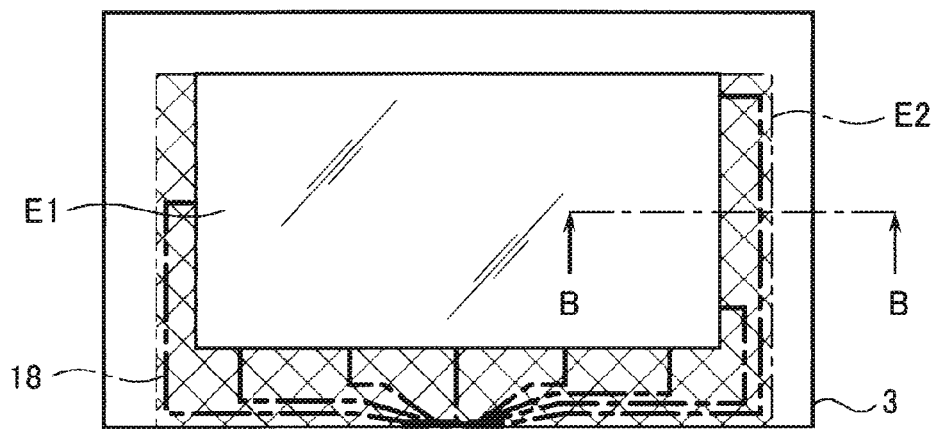
FIG. 2A is a planar view of one example of the touch panel according to the present invention.

Referring to FIG. 2A, the lead-out lines 18 are lines which are lead out from the respective ends of the first electrodes 13 and the second electrodes 14 in a lead-out line wiring region E2 (shown in FIG. 2A as a shaded region) which is a U-like shaped portion located outside of the operation region E1. The lead-out lines 18 are formed by forming a metallic film such as MAM (i.e., Mo/Al/Mo) and APC (i.e., Ag/Pd/Cu) by sputtering and forming a predetermined pattern to end of the substrate 11 by etching.

In a manner described above, in order to maintain the accuracy as a position sensor, the sensor unit 2 includes the first electrodes 13 and the second electrodes 14 constituted of linear electrodes are arranged on the substrate 11 in a XY matrix fashion in an electrically insulated condition. Thus, it is possible to detect which electrode in the X direction and which electrode in the Y direction, not just an approximate position on the electrode, and calculate the position using an intersection point of the detected electrodes.

Furthermore, there is provided a cover member 19 which is disposed on the front face side of the substrate 11 (i.e., an operation face 11b side of the substrate 11) and at inner side of the lead-out line wiring region E2 so as to avoid the lead-out line wiring region E2 of the lead-out lines 18, and so as to at least cover the operation face 11b side of the substrate 11 on the opposite side of the lead-out lines 18 when the housing portion 3 is formed by insert injection molding.

The cover member 19 is shaped so as to avoid the lead-out line wiring region E2 disposed on the operation opposing face 11a side when the housing portion 3 is formed by insert injection molding. By disposing the cover member 19 on the operation face 11b of the substrate 11, a step portion is created between the cover member 19 and the operation face 11b of the substrate 11 (in other words, the difference in level between the cover member 19 and the substrate 11 is created). During the insert injection molding of the housing portion 3, the resin material of the housing portion 3 is moved so as to fill this step portion. Consequently, when the manufacture of the touch panel 1 is completed, the lead-out line wiring region E2 is covered by the housing portion 3, thereby making the lead-out lines 18 from outside without providing the decorative layer or processing the substrate 11 itself.

If the cover member 19 is made of glass material, there are advantages that it can provide high transparency and a high-class appearance with a texture of the glass, and that it has chemical resistance, weather resistance, wear resistance and such, making it possible to be used in various usage environment.

If the cover member 19 is made of transparent resin material (e.g., polycarbonate, triacetylcellulose, acrylic resin), there are advantages that, when it is dropped and broken, the broken pieces are less likely to scatter compared to the one made of glass material, that it is easy to form various coatings (e.g., an antireflective coating, an anti-glare coating, an anti-finger print coating) on the surface of the cover member, and that it has a high affinity with the housing portion 3 which is also made of resin material.

Figure 3:
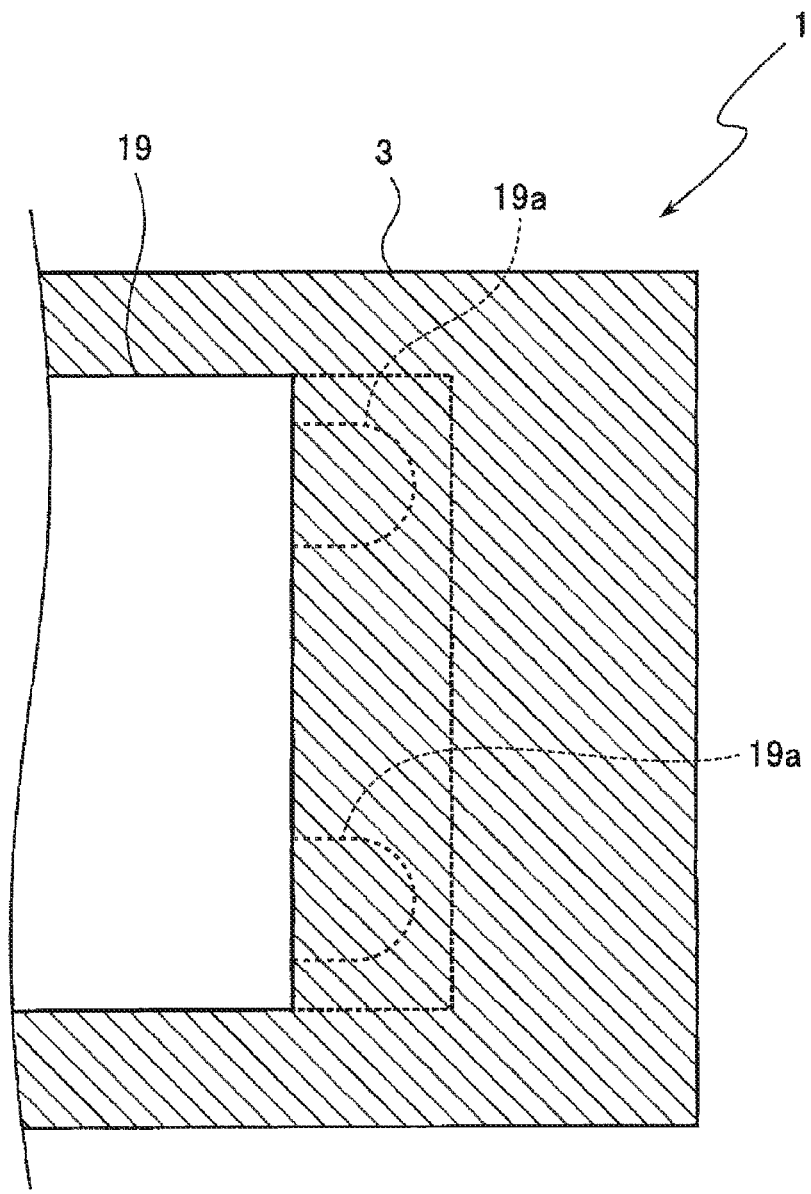
FIG. 3 shows another example in which a cover member includes a projection for coming-off prevention.

Furthermore, if the transparent resin material is used to form the cover member 19, it is easy to form a projection 19a having an arbitrary shape by resin molding which functions as a fitting portion with the housing portion 3, as shown in FIG. 3. By providing such projection 19a, a joint region (i.e., a contact area) with the housing portion 3 is increased, thereby preventing the cover member 19 from coming off from the housing portion 3 when the touch panel 1 is dropped. The shape and number of the projection 19a shown in FIG. 3 is an example only, and thus the shape, size and number of the projection 19a may be arbitrarily chosen as long as the projection(s) 19a can fit with the housing portion 3 and prevent the cover member from coming off from the housing portion 3.

In order to prevent an increase in the thickness of the touch panel 1 itself when the cover member 19 is disposed on the substrate 11, the thickness of the substrate 11 and the thickness of the cover member 19 may be adjusted in a suitable manner in accordance with the thickness of the touch panel 1. As one example, when the thickness of the substrate 11 is 1.1 mm as the traditional one, the thickness of the substrate 11 may be 0.5 mm, and the thickness of the cover member 19 may be 0.6 mm, for example, which gives the total thickness of 1.1 mm which is the same as the thickness of the substrate used in common. In addition, the number of the cover member 19 is not limited to one, that is, a plurality of cover members 19 may be overlapped each other (for example, when the target thickness is 0.6 mm, three cover members 19 each having the thickness of 0.2 mm may be provided).

As described above, by disposing the cover member 19 on the operation face 11b of the substrate 11 and at the inner side of the lead-out line wiring region E2 (i.e., at an inward location with respect to the lead-out line wiring region E2) so as to at least avoid the lead-out line wiring region E2 of the lead-out lines 18, the step portion created between the cover member 19 and the substrate 11 is covered by the resin material after the insert injection molding of the housing portion 3. Consequently, there is no need to provide the decorative layer for masking the lead-out lines 18 as was the case in the conventional art, but still has the same effect as when the decorative layer is provided. Furthermore, since the resin material can be moved into the step portion created by the cover member 19, a front face of the cover member 19 and a front face of the housing portion 3 can be flush with each other in a seamless fashion.

As described above, the cover member 19 which is formed into a shape such that at least the lead-out line wiring region E2 is covered by the resin material of the housing portion 3 in the insert injection molding of the housing portion 3, is disposed on the operation face 11b of the substrate 11. However, as shown in FIG. 4, the cover member 19 may be formed into a shape such that the resin material of the housing portion 3 is allowed to extend in the operation region E1.

Since the resin material used for the housing portion 3 has high dielectric constant, it is possible to detect the position of a finger by the electrode portion 12 via the front face 3a of the housing portion 3 extending to the operation region E1. Thus, in the case the cover member 19 is disposed as shown in FIG. 4 in which a part of the operation region E1 is covered by the resin material of the housing portion 3, it is possible to print markings such as operation buttons 3b as shown in the lower illustration in FIG. 4 on a portion of the housing portion 3 covering the operation region E1, and the electrode portion 12 may be configured to function the respective buttons 3b. Consequently, operational function can be added easily without forming a separate push button on the housing portion 3.

Furthermore, the shape of the cover member 19 may be designed into arbitrary shape such as a circular shape and a polygonal shape. Thus, the design can be arbitrarily changed by only changing the shape of the cover member 19 while using the common sensor unit 2.

The housing portion 3 is made of a thermoplastic synthetic resin such as commodity plastics and engineering plastics. The housing portion 3 is formed by insert injection molding using resin material, so that a front face thereof is arranged at a side of the operation face 11b corresponding to the operation region E1 (i.e., the region operated by a finger) of the sensor unit 2, that the housing portion 3 sandwiches the outer edge of the substrate 11 from the upper and lower sides (i.e., the front and back sides) so as to cover the step portion created by the cover member 19 disposed on the operation face 11b of the substrate 11, and that the front face 3a of the housing portion 3 is arranged flush with (i.e., on the same plane as) the front face of the cover member 19 in a seamless fashion.

Furthermore, the housing portion 3 is formed by insert injection molding so as to at least cover the lead-out line wiring region E2 of the lead-out lines 18 of the electrode portion 12 (i.e., the first electrodes 13, the second electrodes 14) formed on the operation opposing face 11a side of the substrate 11. By doing so, the lead-out lines 18 are directly covered by the housing portion 3, and thus the lead-out lines 18 can be prevented from corroding even under extreme condition such as a performance evaluation test, and the reliability of the product can be ensured.

Figure 2B:
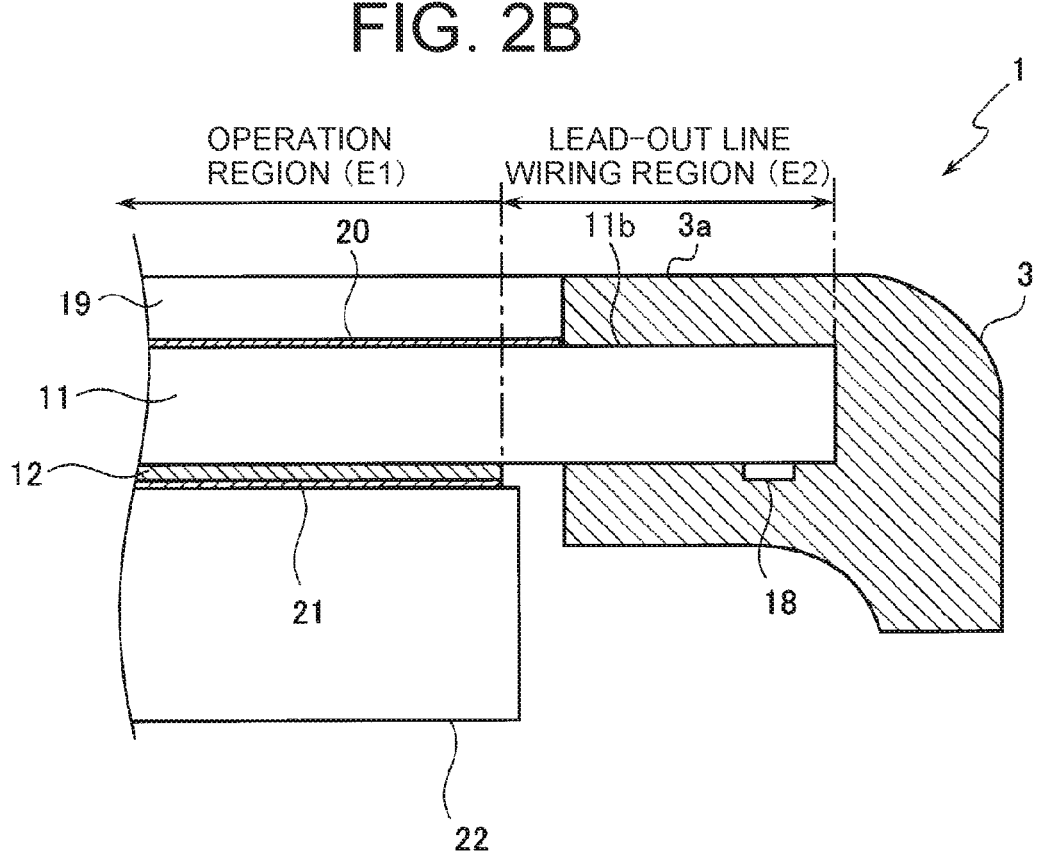
FIG. 2B is an enlarged cross-sectional view taken along a line B-B in FIG. 2A.

For the touch panel 1 configured as described above, the operation opposing face 11a (i.e., the face on which the sensor unit 2 is formed) of the substrate 11 is adhesively fixed to a display device (for example, various display devices such as a liquid crystal display and an EL display) 22 via an adhesive layer 21 such as a transparent adhesive tape, as shown in FIG. 2B.

By mounting the touch panel 1 on the display device 22 as one embodiment of an input device, the display device 22 can function as a display device with a touch panel (i.e., a touch panel device).

As explained above, the touch panel 1 according to this embodiment is manufactured by disposing the cover member 19 on the operation face 11b of the substrate 11 so as to avoid the lead-out line wiring region E2 of the lead-out lines 18 of the first electrodes 13 and the second electrodes 14 and so as to cover at least a part of the operation region E1, and forming the housing portion 3 by insert injection molding using resin material to the step portion created with respect to the substrate 11 by disposing the cover member 19, so as to make the front face 3a of the housing portion 3 flush with the front face of the cover member 19, and so as to sandwich the outer edge of the substrate 11 from the upper and lower sides.

Thus, it is possible to mask the lead-out lines 18 without providing the decorative layer for masking the lead-out lines 18 to make them not visible from outside, resulting in reduction in the manufacturing cost. Also, as mentioned above, the substrate 11 can be prevented from coming off from the housing portion 3 due to the strong impact such as dropping as was the case in the conventional device with the engagement structure using the adhesive layer, thus the touch panel with high reliability can be provided.

Furthermore, by designing the shape of the cover member 19 into an arbitrary shape such as a circular shape and a polygonal shape, the design of the touch panel 1 can be arbitrarily changed by only changing the shape of the cover member 19 while using the common sensor unit 2.

Furthermore, as explained above, the housing portion 3 is formed by insert injection molding so as to at least cover the region of the lead-out lines 18 of the respective electrodes of the first electrodes 13 and the second electrodes 14, and the lead-out lines 18 are entirely covered by the resin. Thus, the moisture is less likely to enter from outside, and the sufficient effect is exerted against corrosion of the lead-out lines 18.

Moreover, in the conventional art, it is needed to provide the decorative portion to prevent the lead-out lines from being visible from outside while forming the cover member to extend to where the decorative portion is located. However, in the present invention, the cover member 19 is sandwiched such that the housing portion 3 covers the portion with the lead-out lines 18, thereby downsizing the cover member 19. Especially, for the cover member 19 made of glass material, since the plurality of cover members 19 is manufactured from one glass plate, downsizing of the cover member 19 itself can increase the number of cover members 19 that can be manufactured from one glass plate, thereby reducing the manufacturing cost.

Furthermore, when the cover member 19 is made of transparent resin material, the projections 19a serving as the fitting portion with the housing portion 3 and having an arbitrary shape can be easily formed by resin molding on the cover member 19 at an abut portion at which the cover member 19 abuts on the housing portion 3. Consequently, these projections 19a increase the joint region (i.e., contact area) with the housing portion 3, thereby preventing the cover member 19 from coming off from the housing portion 3 when the touch panel 1 is dropped.

The embodiments described herein are only representative embodiments of the present invention and are not intended to limit the present invention. That is, the shown embodiments can be modified or changed in various ways without departing from the spirit and scope of the present invention.

LIST OF REFERENCE SIGNS 1 touch panel
2 sensor unit
3 housing portion
3a front face
3b operation button
11 substrate
11a back face (operation opposing face)
11b front face (operation face)
12 electrode portion
13 first electrode
14 second electrode
14a electrode film
15 intersecting portion
16 insulating layer
17 bridge line
18 lead-out line
19 cover member
19a projection
20 adhesive layer
E1 operation region
E2 lead-out line wiring region

The invention claimed is:

1. A projected capacitive touch panel comprising,
a sensor unit including first electrodes and second electrodes intersecting with each other, each of the first electrodes and the second electrodes being constituted of a plurality of rows of electrodes, the first electrodes and the second electrodes being formed on a back face of a substrate having translucency such that an intersecting portion of the first electrode and the second electrode is insulated, and
a housing portion formed by insert injection molding so as to sandwich the sensor unit,
wherein a cover member is provided on a front face of the substrate via an adhesive layer so as to avoid lead-out lines of the first electrodes and the second electrodes and so as to cover at least a part of an operation region of the sensor unit, and
wherein the housing portion is formed by insert injection molding using resin material so as to sandwich an outer edge of the sensor unit from upper and lower sides, so as to eliminate a difference in level between the cover member and the substrate such that a front face of the housing portion is arranged flush with a front face of the cover member, and
wherein the lead-out lines disposed on the back face side of the substrate are made invisible from an operation face side of the substrate by only the housing portion.

2. The touch panel according to claim 1, wherein the housing portion is molded so as to cover at least front faces of the lead-out lines.

3. The touch panel according to claim 2, wherein the cover member is made of glass material.

4. The touch panel according to claim 2, wherein the cover member is made of transparent resin material.

5. The touch panel according to claim 4, wherein a projection is provided to the cover member at an abutting portion at which the cover member abuts on the housing portion.

6. The touch panel according to claim 1, wherein the cover member is made of glass material.

7. The touch panel according to claim 1, wherein the cover member is made of transparent resin material.

8. The touch panel according to claim 7, wherein a projection is provided to the cover member at an abutting portion at which the cover member abuts on the housing portion.

* * * * *